United States Patent
Chen et al.

(10) Patent No.: US 7,269,206 B2
(45) Date of Patent: Sep. 11, 2007

(54) FLEXIBLE CORRELATION FOR CELL SEARCHING IN A CDMA SYSTEM

(75) Inventors: Sheng-Jie Chen, Tao-Yuan Hsien (TW); Yi-Yuan Tsai, Hsin-Chu (TW)

(73) Assignee: Benq Corporation, Gueishan, Tao-Yuan Hsien (TW)

( * ) Notice: Subject to any disclaimer, the term of this patent is extended or adjusted under 35 U.S.C. 154(b) by 734 days.

(21) Appl. No.: 10/249,863

(22) Filed: May 13, 2003

(65) Prior Publication Data

US 2004/0228393 A1 Nov. 18, 2004

(51) Int. Cl.
*H04B 1/00* (2006.01)

(52) U.S. Cl. .................. 375/150; 375/147; 375/343

(58) Field of Classification Search ............. 375/150, 375/240.27, 343, 149, 147
See application file for complete search history.

(56) References Cited

U.S. PATENT DOCUMENTS

| | | | |
|---|---|---|---|
| 5,910,948 A | 6/1999 | Shou et al. | |
| 5,930,366 A | 7/1999 | Jamal et al. | |
| 6,038,250 A | 3/2000 | Shou et al. | |
| 6,064,690 A | 5/2000 | Zhou et al. | |
| 6,226,315 B1 | 5/2001 | Sriram et al. | |
| 6,363,060 B1 | 3/2002 | Sarkar | |
| 2003/0095516 A1* | 5/2003 | Ok et al. | 370/331 |
| 2003/0185283 A1* | 10/2003 | Ho et al. | 375/147 |
| 2003/0202564 A1* | 10/2003 | Ho et al. | 375/147 |
| 2004/0161020 A1* | 8/2004 | Mathew et al. | 375/149 |

OTHER PUBLICATIONS

Yi-Pin Eric Wang and Tony Ottosson, Cell Search in W-CDMA, IEEE Journal on Selected Areas in Communications, Aug. 2000, pp. 1470-1182, vol. 18, No. 8.

* cited by examiner

*Primary Examiner*—Chieh M. Fan
*Assistant Examiner*—Julia P Tu
(74) *Attorney, Agent, or Firm*—Winston Hsu

(57) ABSTRACT

Within a synchronization stage, m candidates are selected according to secondary correlation results that are generated in a standard code group and slot number identification process. Each candidate contains a respective code group number and slot number, and m is greater than 1. A primary scrambling code correlation process is performed with each candidate to obtain a corresponding primary correlation result for an associated primary scrambling code number. The primary scrambling code correlation process for each candidate is performed over x slots, where x is determined by the ratio f/m, f being the number of slots per frame, and x being less than f. Within integer constraints, x is ideally f/m. The respective code group number, slot number and primary scrambling code number of the candidate having the greatest primary correlation result are then selected as a synchronization result.

9 Claims, 10 Drawing Sheets

FLEXIBLE CORRELATION FOR CELL SEARCHING IN A CDMA SYSTEM

BACKGROUND OF INVENTION

1. Field of the Invention

The present invention relates to cell searching in a wideband code division multiple access (WCDMA) system. More specifically, the flexible use of correlators when selecting the primary scrambling code from a multiple of scrambling code groups is disclosed.

2. Description of the Prior Art

Spread spectrum communication systems are becoming increasingly important in cellular networks. In particular, wideband code division multiple access (WCDMA) systems are entering the marketplace, and offer the potential of significantly increased performance and reliability.

To establish a network connection in a WCDMA system, the user equipment (UE) must first perform a cell search procedure. The cell search procedure enables the UE to obtain timing and code synchronization for the downlink channel. Various methods are known in the prior art for performing a cell search procedure. Attention is drawn, for example, to the article "Cell Search in W-CDMA" by Yi-Pin Eric Wang and Tony Ottosson in Vol.18, No.8 (August 2000 edition) of *IEEE Journal on Selected Areas in Communications*, which is included herein by reference.

A simple overview of cell searching is presented in the following. Please refer to FIG. 1. FIG. 1 is a block diagram of a downlink Common Control Channel (CCH) 10 in a WCDMA system. The CCH 10 is broken up into a series of frames 12. Each frame 12 contains fifteen slots 14. Each slot 14 holds ten symbols, each of 256 chips. Hence, each slot 14 is 2560 chips in length. Please refer to FIG. 2 in conjunction with FIG. 1. FIG. 2 is a block diagram of a slot 14 in the CCH 10. The first symbol 16 in each slot 14 holds a primary synchronization channel (PSCH) 16p and a secondary synchronization channel (SSCH) 16s. The remaining nine symbols 18 follow after the first symbol 16, and provide the primary common control physical channel (PCCPCH). The PSCH 16p and SSCH 16s are orthogonal to each other, and hence can be broadcast on top of each other. The PSCH 16p is encoded by way of a primary synchronization code (PSC) that is the same for all base stations, and that does not change. The SSCH repeatedly transmits a length 15 sequence of modulated code of length 256 chips; the secondary synchronization codes (SSC) are transmitted in parallel with primary SCH. Each SSC is chosen from a set of 16 different codes of length 256. This sequence on the secondary SCH indicates which code group the cells downlink scrambling code belongs to. Please refer to FIG. 3. FIG. 3 is a block diagram of a common pilot channel (CPICH) 20 broadcast with the CCH 10. The coding used for the CPICH 20 is unique to the broadcasting base station. In a WCDMA system, a base station can use one of 512 different primary scrambling codes for the CPICH 20, which are broken into 64 code groups, each having 8 respective codes. The PSC of the PSCH 16p is common across all base stations, and can thus be used for slot 14 synchronization. Although the SSC of the SSCH 16s changes on a slot 14 by slot 14 basis, the sequence pattern of code change of the SSCH 16s is determined by the code group into which the code used for the CPICH 20 lies. That is, there are 64 code sequence patterns for the SSCH 16s to follow, each of which corresponds to a particular code group associated with the code used for the CPICH 20. By correlating the received CCH signal 10 with all possible SSCH 16s code sequences and identifying the maximum correlation value, it is possible to learn the code group of the CPICH 20, and to obtain frame 12 synchronization. This is due to the fact that the SSCH 16s changes according to a predefined sequence, the starting sequence of which is known and which is sent at the beginning of every frame 12, thus enabling frame synchronization. Once the code group of the CPICH 20 is learned, it is possible to obtain the primary scrambling code used by the cell by performing symbol-by-symbol correlation over the CPICH 20 with all eight of the codes in the code group identified for the CPICH 20. Once the primary scrambling code used by the base station has been identified, system and cell specific broadcast channel (BCH) information can be read.

Based upon the above, cell searching is thus typically broken into the three following steps: Step 1: Slot synchronization.

Utilize the PSCH 16p to perform slot synchronization. This is typically done with a matched filter (or similar device) that is matched to the PSC that is common to all base stations. Typically, output from the matched filter of a frame's worth of slots is non-coherently combined, and a resulting maximum peak is found. The slot boundary is obtained from the maximum peak.

Step 2: Frame synchronization and code group identification.

The slot timing obtained in step 1 is used to correlate the SSCH 16s with all possible SSC code sequences. There are sixteen SSC codes, SSC1 to SSC16, that make up the SSCH code sequence. The SSCs are correlated over a frame's worth of slots and accumulated over all possible frame boundaries to yield a table of values. Each entry in the table has a column/row position that indicates the corresponding scrambling code group and frame slot boundary of the entry. The maximum entry in the table is chosen as the candidate for frame boundary and code group determination.

Step 3: Scrambling code identification.

Symbol-by-symbol correlation is performed on the CPICH 20 for all scrambling codes within the code group identified in step 2. The maximum correlation value is selected as the primary scrambling code of the base station. This maximum correlation value is acceptable only if it exceeds a threshold value.

Please refer to FIG. 4. FIG. 4 is a simple block diagram that illustrates cell synchronization for a prior art UE 30. Of course, the UE 30 will contain many more components than those shown in FIG. 4, which is restricted to the present discussion. The UE 30 includes a transceiver 39 and a synchronization stage 38. The transceiver 39 receives broadcasts from a base station (not shown) and passes broadcast data to the synchronization stage 38 in a manner familiar to those in the art of wireless devices. The synchronization stage 38 includes a stage 1 31, a stage 2 32 and a stage 3 33. The stage 1 31 performs the slot synchronization of step 1 discussed above. Results from stage 1 31 are passed to stage 2 32, which performs the frame 12 synchronization and code group identification of step 2. Results from stage 2 32 are then passed on to stage 3 33, which performs the scrambling code identification of step 3.

Stage 1 31 includes a peak profiler 34. The peak profiler 34 contains the PSC 35 that is common to all base stations, and generates peak profile data 36 that is obtained by matching the PSC 35 against the PSCH 16p received from the transceiver 39, and which is non-coherently combined over a frame 12 of slots 14. The profile data 36 holds data for a predetermined number of chips, and as the PSCH 16p repeats with every slot 14, it is common to hold enough data to cover an entire slot 14, i.e., 2560 chips. The chip in the profile data 36 having the highest peak profile is assumed to mark the PSCH 16p, and is thus used as the PSCH path position 37, the slot boundary offset. This is illustrated in FIG. 5, which is an example graph of peak profile data 36 (not to scale). Stage 1 31 notes that in the profile data 36, a maximum valued peak occurs at chip number 1658. The PSCH path position 37 would thus hold a value indicative of the peak path position at chip 1658. The PSCH path position 37 is forwarded to stage 2 32 as the slot 14 synchronization point. Utilizing the slot 14 position marked by the PSCH path position 37, stage 2 32 performs step 2 outlined above to generate a code group value 32g and a slot number 32s.

The stage 2 32 has a correlation unit 32c that generates a correlation table 32t based upon the PSCH path position 37 (the slot boundary offset) and secondary correlation results of the SSCH 16s with the SSCs. FIG. 6 illustrates a sample correlation table 32t, which is generated form correlating the received signal with sixteen SSCs correlators, and then accumulating and shifting the correlation results over fifteen slots. The SSCH 16s code sequence spans fifteen slots 14 (i.e., a frame 12 is fifteen slots 14 long), and encodes for one of 64 code groups. Each entry $C_0$ to $C_{959}$ represents a correlation result of an SSCH 16s code group sequence, with the slot 14 at the PSCH path position 37 being a particular slot number in that code group sequence. The highest value $C_n$ is selected as the basis for the code group number 32g and the slot number 32s. For example, if the entry $C_{17}$ were the highest valued entry in the table 32t, the stage 2 32 would select the value "1" as the code group number 32g, and the value "2" as the slot number 32s. This would indicate that the CPICH 20 is encoded by way of one of the eight scrambling codes from code group "1", and that the PSCH path position 37 is synchronized to slot "2" within its respective frame 12. In this manner, frame 12 synchronization is obtained. Finally, the results from stage 2 32 are passed on to stage 3 33, which subsequently performs step 3 to generate a primary scrambling code 33p for the CPICH 20.

The stage 3 33 also includes a correlation unit 33c, which correlates the CPICH 20 with all possible primary scrambling codes contained within the code group 32g. Primary correlation results 33r are respectively obtained in this manner for the primary scrambling codes. The primary scrambling code having the largest primary correlation result is chosen as the primary scrambling code 33p, but only if the corresponding primary correlation result exceeds a threshold value 33x. For example, if each code group contains eight primary scrambling codes $S_0$ to $S_7$, the primary correlation results 33r would be: $C_0, C_1, C_2, C_3, C_4, C_5, C_6, C_7$, which are respectively the primary correlation results of the eight primary scrambling codes $S_0$ through $S_7$ in the code group indicated by the code group number 32g. If $C_6$ holds the highest primary correlation value, then the stage 3 33 would place the value of "6" as the primary scrambling code number 33p, assuming that $C_6$ also exceeded the threshold value 33x.

In the event that the maximum of the primary correlation results 33r fails to pass the threshold 33x, the synchronization stage 38 must obtain a new code group number 32g and slot number 32s, and then the stage 3 33 repeats step 3 again with these new values. This may occur several times, and thus slows down the entire synchronization period.

SUMMARY OF INVENTION

It is therefore a primary objective of this invention to provide a cell search method, and related device, that makes flexible use of correlators to select a primary scrambling code across a multiple of code group candidates using only a frame's worth of slots.

Briefly summarized, the preferred embodiment of the present invention discloses a method and related device for performing cell searching. Within stage 2, m candidates are selected according to secondary correlation results that are generated in a standard code group and slot number identification process. Each candidate contains a respective code group number and slot number, and m is greater than 1. A primary scrambling code correlation process is performed with each candidate to obtain a corresponding primary correlation result for an associated primary scrambling code number. The primary scrambling code correlation process for each candidate is performed over x slots, where x is determined by the ratio f/m, f being the number of slots per frame, and x being less than f. Within integer constraints, x is ideally f/m. The respective code group number, slot number and primary scrambling code number of the candidate having the greatest primary correlation result are then selected as a synchronization result.

It is an advantage of the present invention that by selecting multiple candidates from stage 2, and then correlating those candidates over a single frame, a greater probability of finding the correct synchronization result is obtained, while keeping the overall synchronization period down.

These and other objectives of the present invention will no doubt become obvious to those of ordinary skill in the art after reading the following detailed description of the preferred embodiment, which is illustrated in the various figures and drawings.

DETAILED DESCRIPTION

Figure 7:
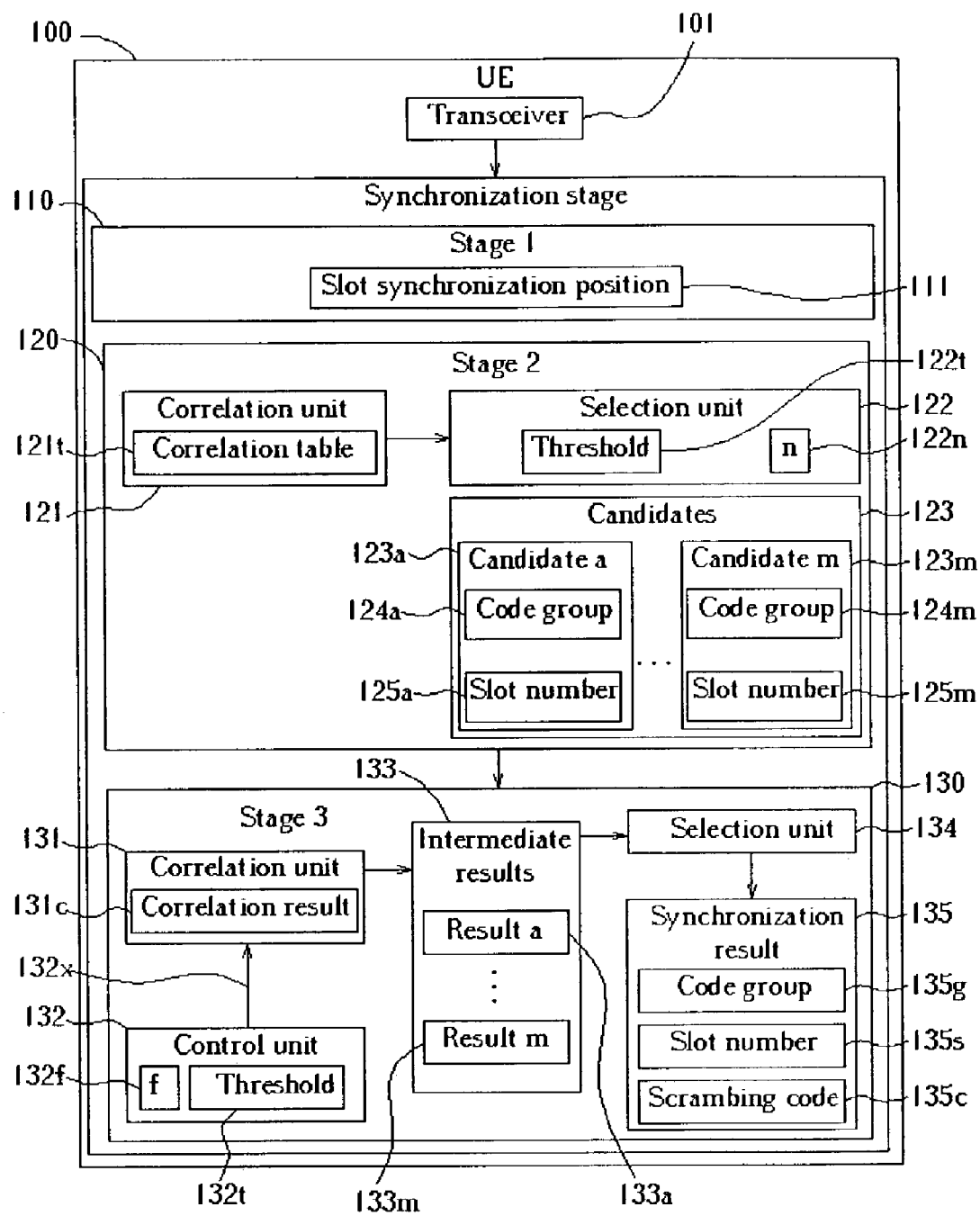
FIG. 7 is a simple block diagram of a UE according to the present invention.
Figure 8:
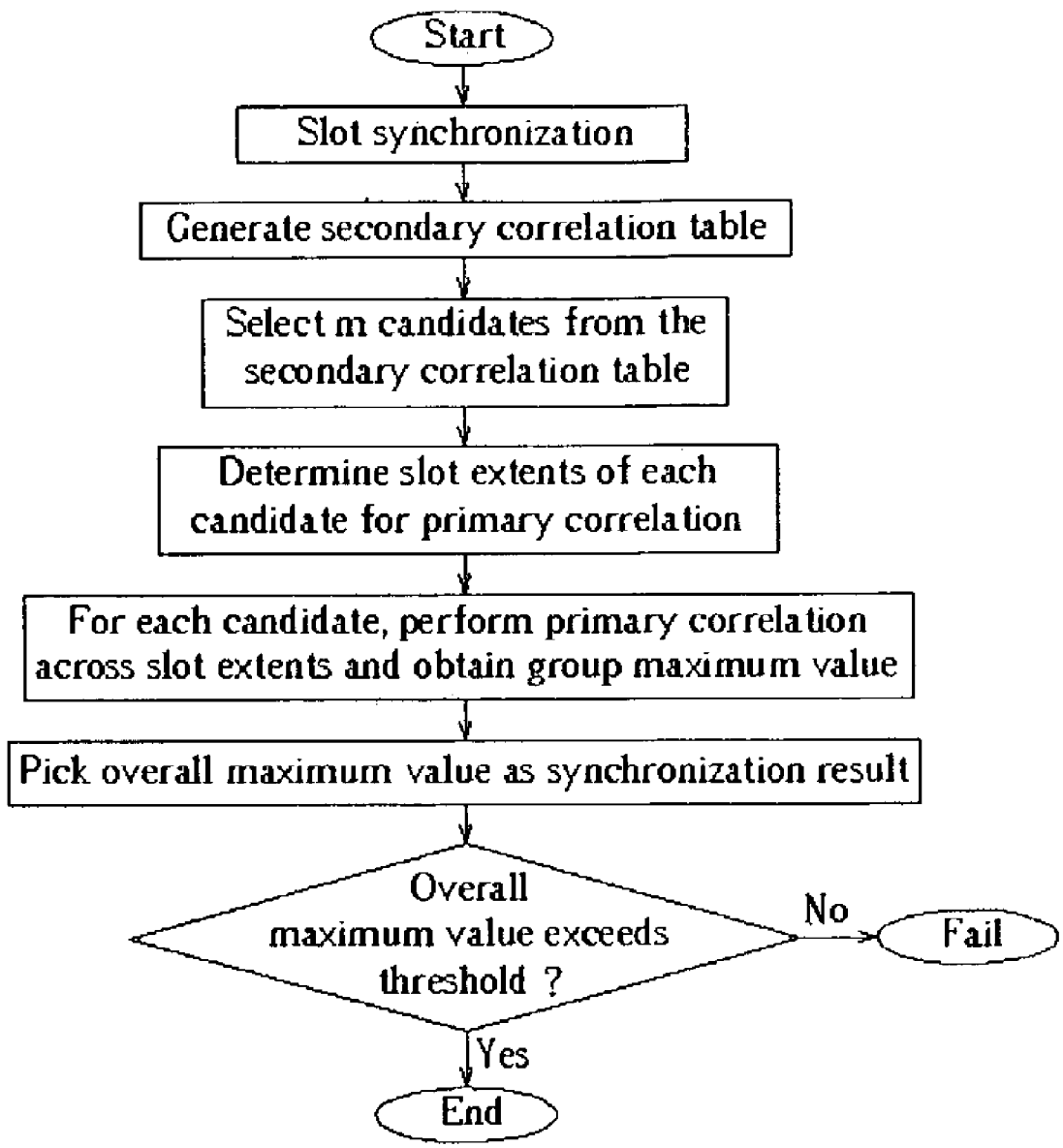
FIG. 8 is a flow chart of the present invention method as employed by the UE of FIG. 7.

Please refer to FIG. 7 and FIG. 8. FIG. 7 is a simple block diagram of a UE 100 according to the present invention. FIG. 8 is a flow chart of the present invention method as employed by the UE 100. Although not shown in FIG. 7, the various stages and units in the UE 100 may be implemented by way of a central processing unit (CPU) executing the appropriate program code to perform the method of the present invention, as detailed in the following. The arrangement of a CPU with program code to perform cell search procedures is well known in the art, and coding the present invention method should be well within the means of one reasonably skilled in the art after reading the following detailed description of the preferred embodiment. Alternatively, dedicated hardware may be used to implement some or all portions of the present invention method. Further, it should be understood that the various units, stages and data structures do not need to match the compartmental arrangement depicted in FIG. 7.

Much of the present invention UE 100 is similar to the prior art UE 30, and so is explained primarily in terms of differences from the UE 30. In particular, the UE 100 includes a transceiver 101 and a stage 1 110 that are equivalent to the prior art UE 30, as well as a secondary correlation unit 120 that generates secondary correlation results 121*t* that may be regarded as a table of correlation results corresponding to code group and slot number information. The UE 100 also includes a primary correlation unit 131 that is similar to that of the UE 30, but rather then providing a primary correlation result 131*c* over a frame 12 of slots 14, the primary correlation unit 131 performs the primary scrambling code correlation procedure over a number of frames 132*x* determined by a primary control unit 132.

Figure 6:
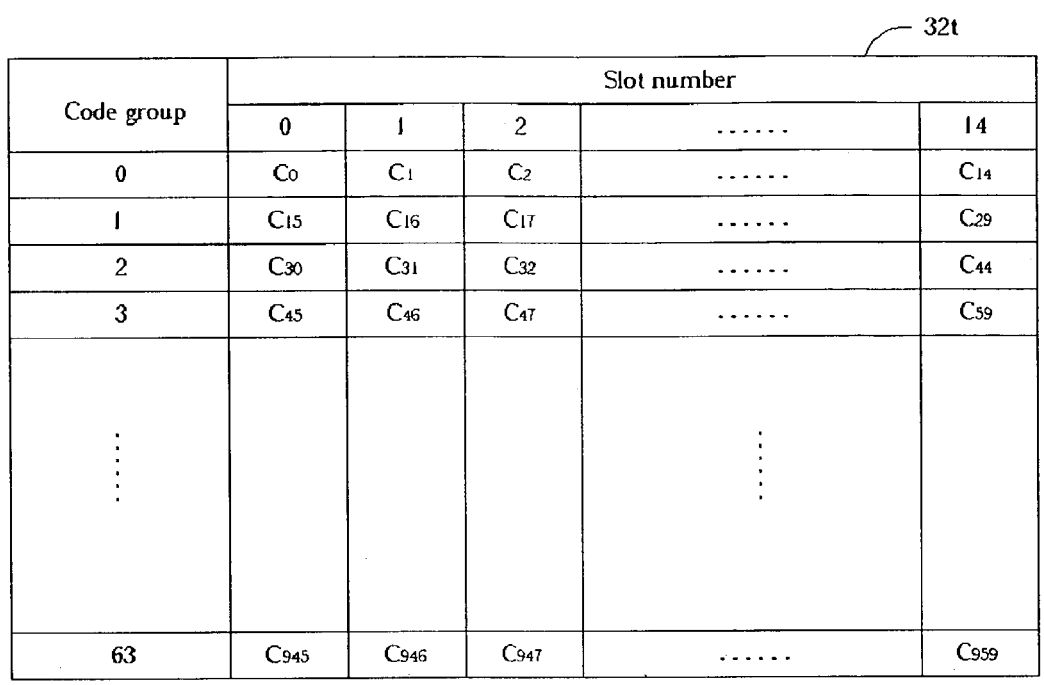
FIG. 6 illustrates a correlation table indicated in FIG. 4.
Figure 9:
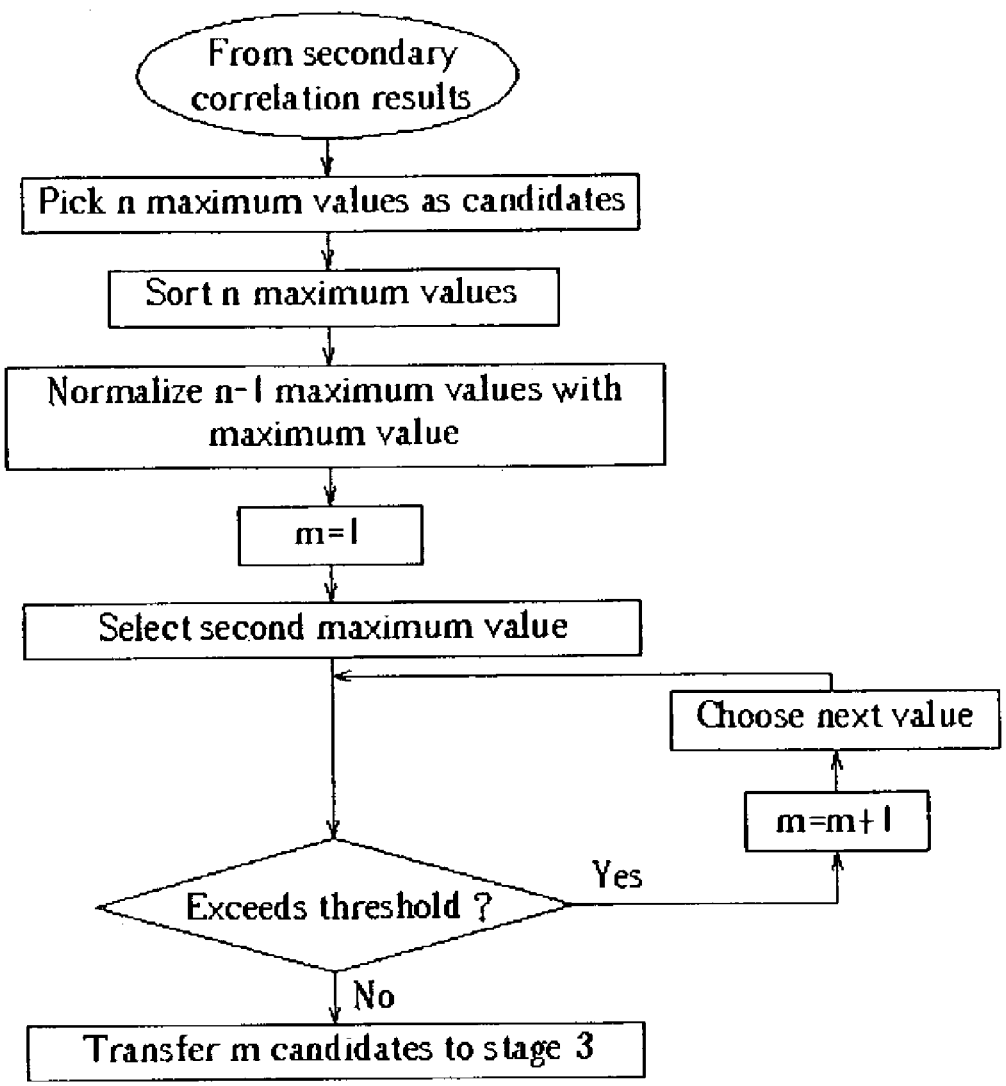
FIG. 9 is a flow chart for a secondary selection unit depicted in FIG. 7.

Initially, the stage 1 110 performs a standard slot synchronization process and thereby obtains a slot synchronization position 111. Stage 2 120 accepts the slot synchronization position 111, which the secondary correlation unit 121 then utilizes to develop the secondary correlation results table 121*t*, again in a standard manner. A secondary selection unit 122 then selects candidates 123 that are subsequently processed by the stage 3 130. FIG. 9 is a flow chart for the secondary selection unit 122. Initially, the secondary selection unit 122 references into the secondary correlation table 121*t* and selects the greatest n 122*n* values. It has been determined that, 93% of the time, the greatest value in the secondary correlation table 121*t* will provide the correct synchronization result 135. However, 5% of the time it is the second-greatest value in the secondary correlation table 121*t* that provides the synchronization result 135. In the preferred embodiment, n is three, as this statistically covers better than 98% of the potential synchronization values, while being sufficiently small to provide the primary correlation unit 131 with enough slots 14 to obtain a reasonably accurate correlation result 131*c*. The selection unit 122 orders the n 122*n* greatest secondary correlation values from the secondary correlation table 121*t* from greatest to least. The n 122*n* secondary correlation values are then normalized by dividing them all by the greatest secondary correlation value. For example, with reference to FIG. 6, assume that the n 122*n* greatest secondary correlation values are, in ascending order: $C_{47}$, $C_{31}$ and $C_{15}$. The corresponding normalized results are then: ($C_{47}/C_{15}$), ($C_{31}/C_{15}$) and ($C_{15}/C_{15}$). The greatest value, $C_{15}$, is passed on immediately as a candidate 123*a*. All other values are sequentially checked in descending order against a preset threshold 122*t*. If any normalized value does not meet the threshold value 122*t*, it and all subsequent normalized values are discarded as candidates. Consequently, the secondary selection unit 122 provides m candidates 123*a*-123*m*, where m is at least 1, and which is less than or equal to n 122*n*. For the purposes of the present invention, though, values of m greater than 1 are considered. Each candidate 123*a*-123*m* contains a respective code group number 124*a*-124*m* and slot number 125*a*-125*m*, which are obtained in a standard manner according to their respective positions within the secondary correlation table 121*t*. For example, if $C_{47}$ becomes the candidate 123*m*, the respective code group number 124*m* would be "3", and the respective slot number 125*m* would be "2". The threshold value 122*t* is designed from the distribution property of the values in the secondary correlation table. From one simulation case, 93% of the time, the greatest value in the secondary correlation table 121*t* will provide the correct synchronization result 135. However, 5% of the time it is the second-greatest value in the secondary correlation table 121*t* that provides the synchronization result 135. In the preferred embodiment, the number of candidates m is three, as this statistically covers better than 98% of the potential synchronization values, while being sufficiently small to provide the primary correlation unit 131 with enough slots 14 to obtain a reasonably accurate correlation result 131*c*. The threshold value may be varied as the situation warrants. From observation in many simulated cases, the optimal value of m is three. This not only covers a large percentage of values, but also provides each candidate five slots of correlation time (assuming fifteen slots per frame). Each candidate can thus easily obtain correlation results, and there is no need to truncate the slot number of the correlation time.

Figure 10:
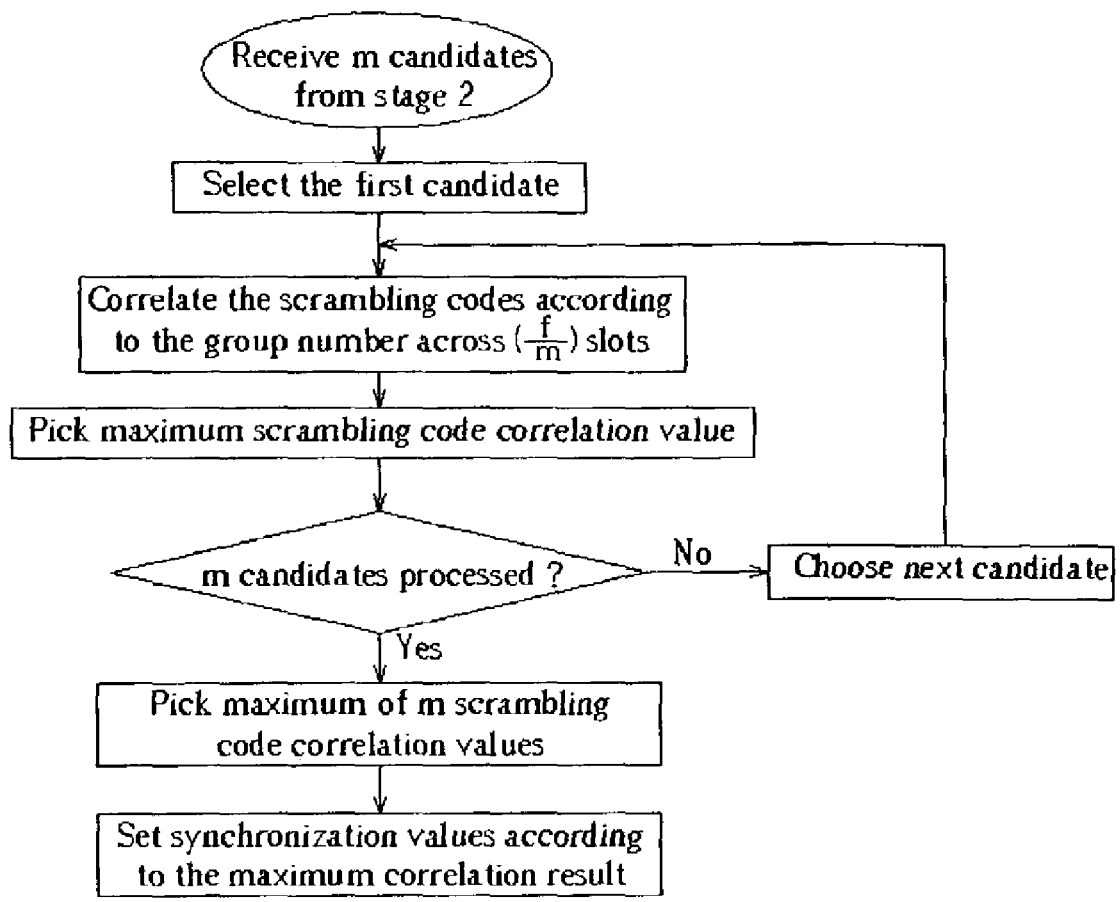
FIG. 10 is a flow chart for a stage 3 depicted in FIG. 7.

FIG. 10 is a flow chart of the stage 3 130. A primary control unit 132 accepts the candidates 123 from the stage 2 120, and determines the number of slots 14 that will be allocated to each candidate 123*a*-123*m* to perform a primary correlation procedure, which is performed by the primary correlation unit 131. The control unit 132 is preset with a value f 132*f* that indicates the number of slots 14 per frame 12. For example, f 132*f* may be fifteen. The primary control unit 132 allocates each candidate 123*a*-123*m*×132*x* slots 14 over which the primary correlation unit 131 performs the primary correlation procedure. Ideally, x=f/m, where m is the number of candidates 123*a*-123*m*, and is the same for each candidate 123*a*-123*m*. However, because the number of slots 14 in a frame 12 may not divide evenly over all of the candidates 123*a*-123*m*, the primary control unit 132 may increase or decrease the value (f/m) by one to make up the difference. The primary control unit 132 successively supplies each candidate 123*a*-123*m* and respective slot extents value 132*x* to the primary correlation unit 131. The primary correlation unit 131 generates respective results 133*a*-133*m* as intermediate results 133. Each result 133*a*-133*m* corresponds to a primary correlation procedure performed over the x 132*x* slots 14 within a frame 12, and contains the greatest primary correlation value and associated code number. That is, for a candidate 123*a*-123*m*, the corresponding result 133*a*-133*m* contains the highest correlation value of all the code within the code group 124*a*-124*m*, and the code number of that highest correlation value.

A selection unit 134 scans the results 133*a*-133*m*, and selects the result 133*a*-133*m* having the highest primary correlation value. This selected result 133*a*-133*m* is used to generate a synchronization result 135. The synchronization result 135 includes a code group number 135*g*, a slot number 135*s* and a primary scrambling code number 135*c*, all of which correspond to the selected result 133*a*-133*m*.

Figure 1:
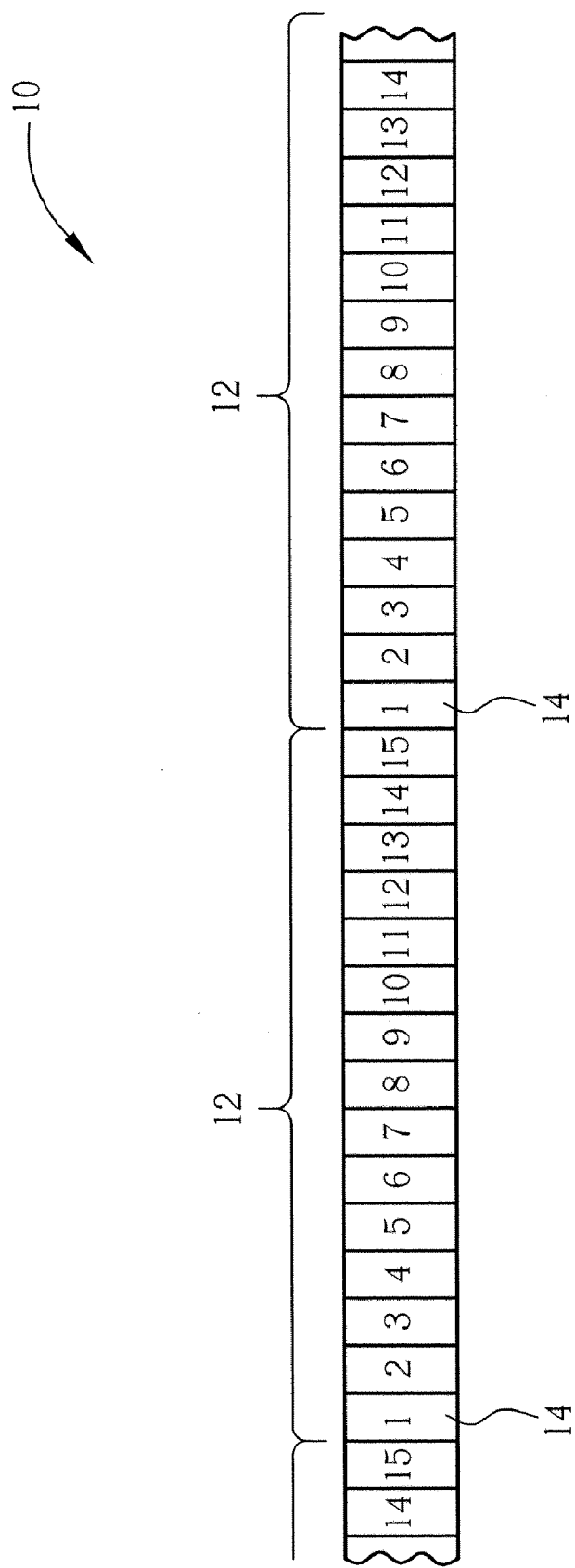
FIG. 1 is a block diagram of a downlink Common Control Channel (CCH) in a WCDMA system.
Figure 2:
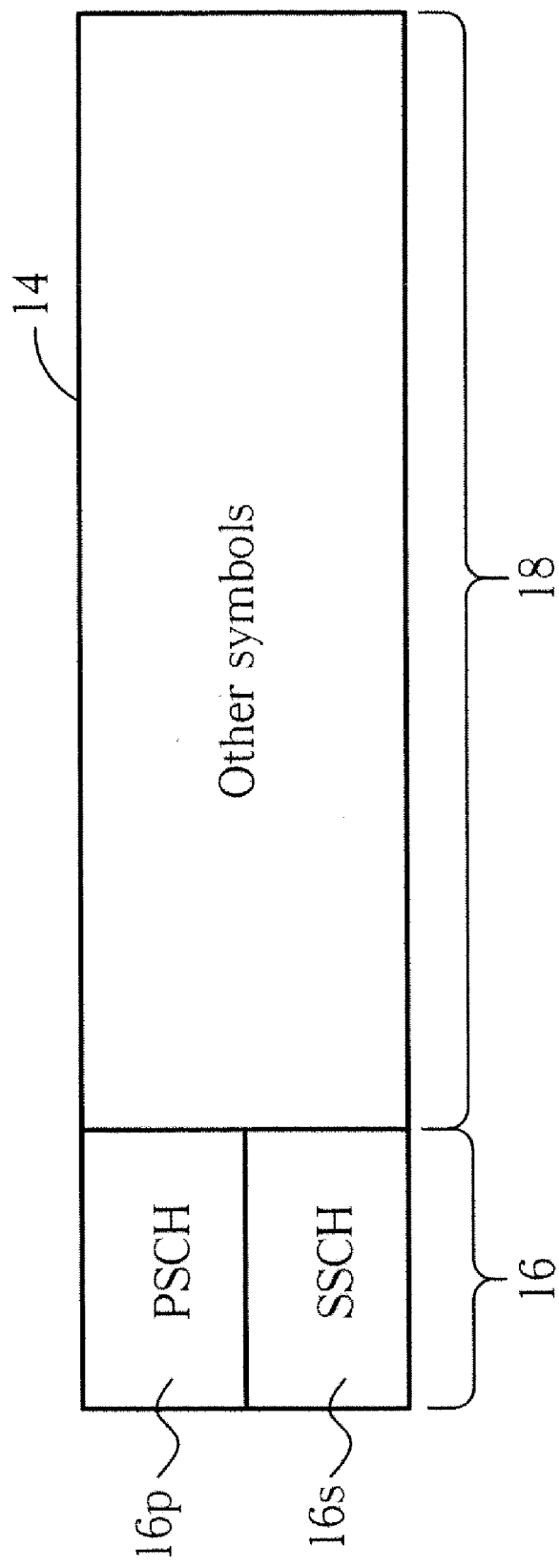
FIG. 2 is a block diagram of a slot in the CCH depicted in FIG. 1.
Figure 3:
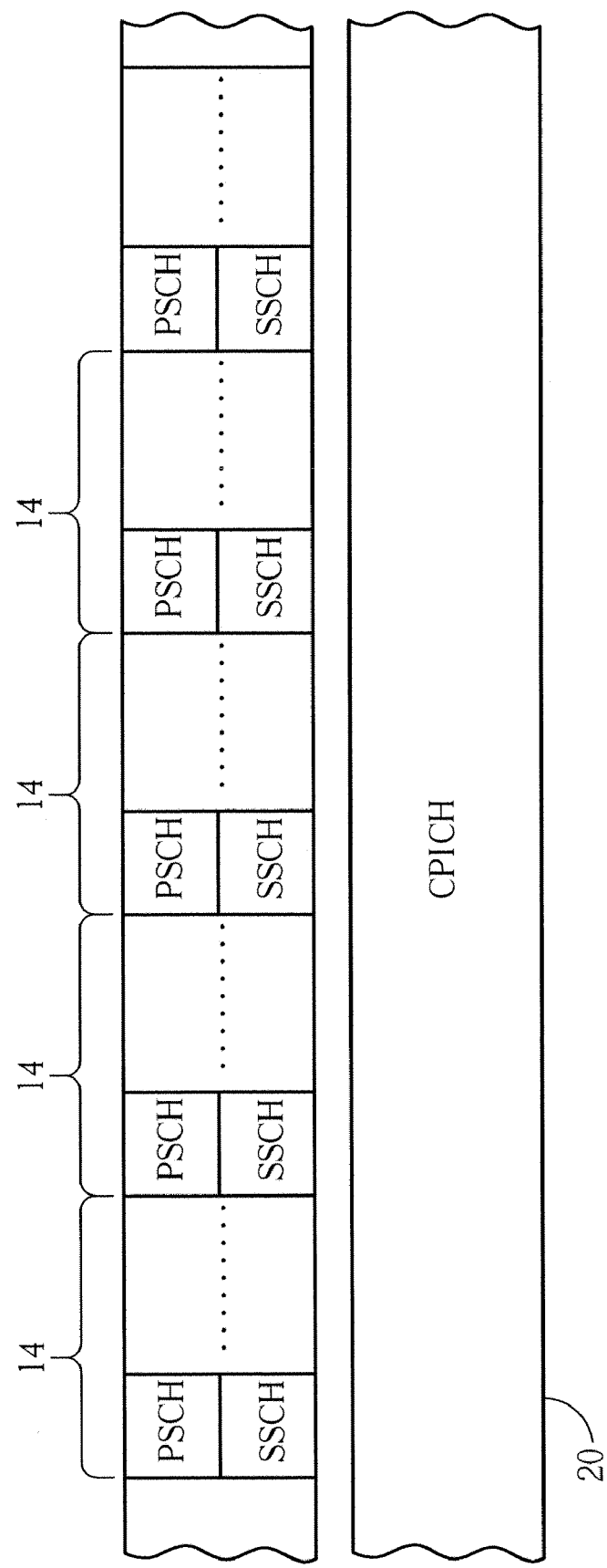
FIG. 3 is a block diagram of a common pilot channel (CPICH) broadcast with the CCH of FIG. 1.
Figure 4:
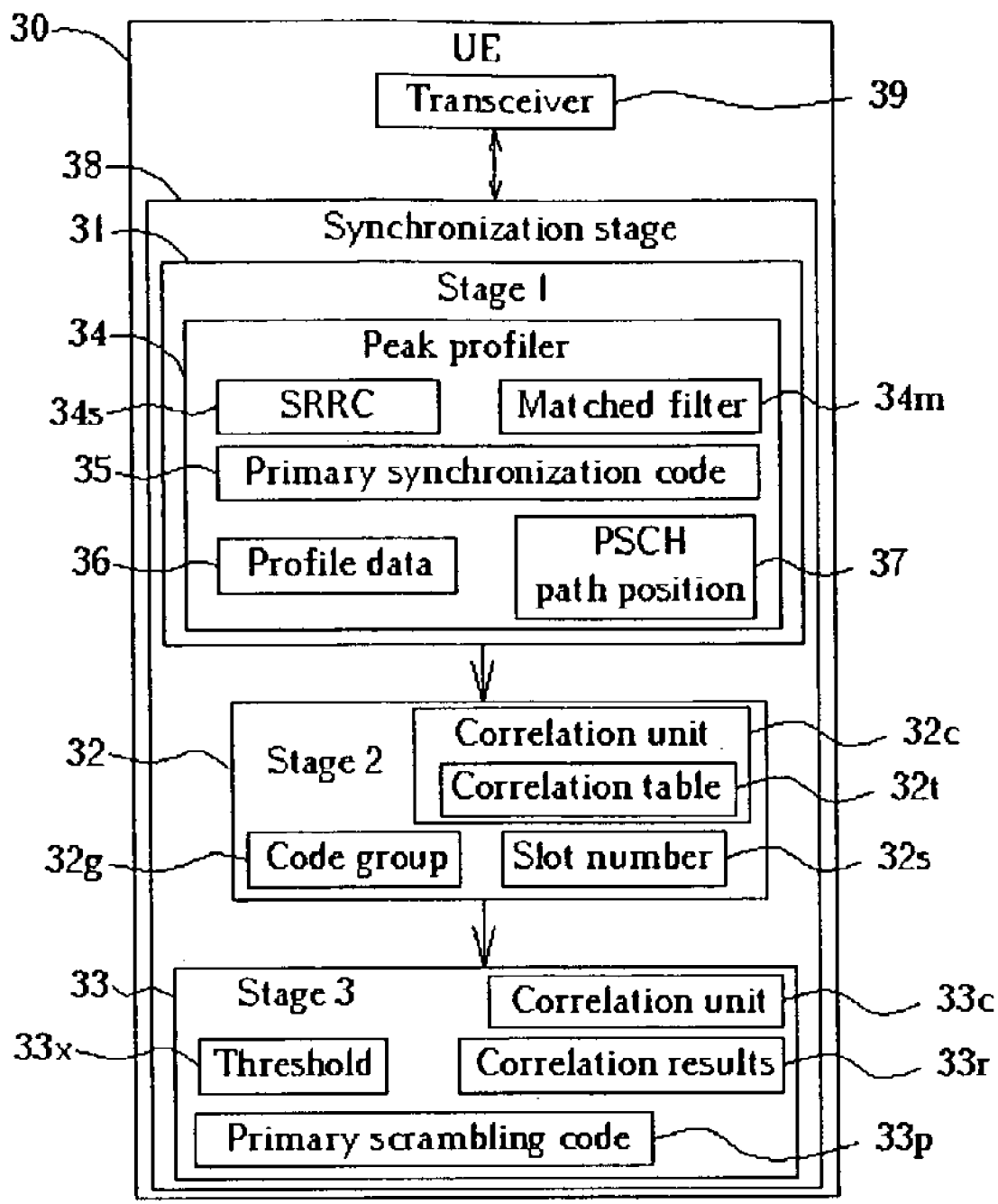
FIG. 4 is a simple block diagram that illustrates cell synchronization portions of prior art user equipment (UE).
Figure 5:
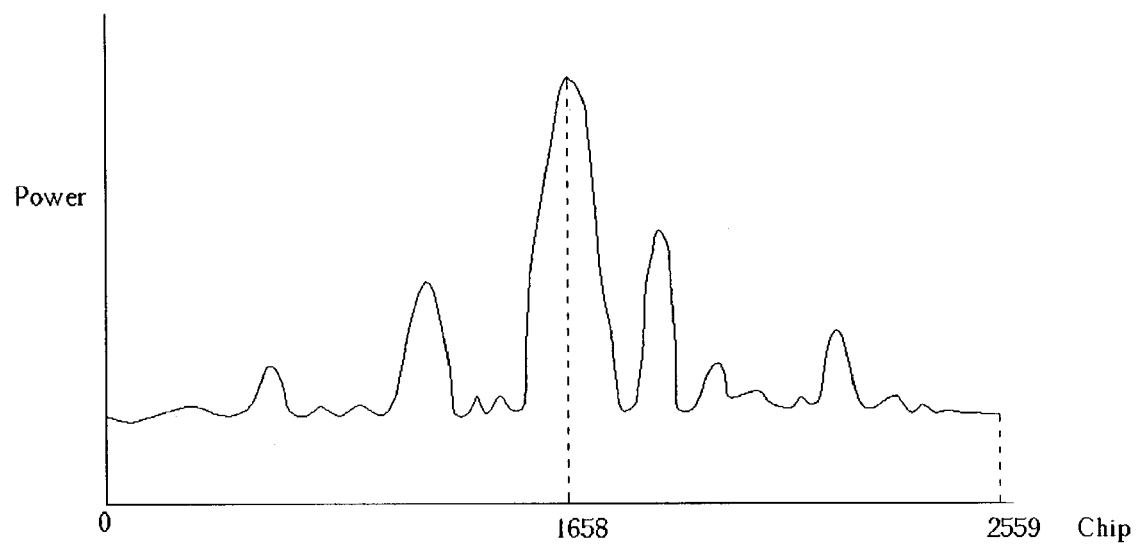
FIG. 5 is an example graph of peak profile data depicted in the UE of FIG. 4.

As an example of the above, consider the situation in which the secondary selection unit 122 has three for a value of n 122*n*, of which two candidates 123*a*-123*m* pass through the secondary selection process. In this case, then, n=3, m=2, and it is assumed that the first candidate 123*a* corresponds to the secondary correlation value $C_{47}$ in FIG. 6, while the second candidate 123*m* corresponds to the secondary correlation value $C_{31}$. Hence, code group 124*a* is "3", slot number 125*a* is "2", code group number 124*m* is "2", and slot number 125*m* is "1". Consistent with FIG. 1, it is assumed that f 132*f* is fifteen. It is also assumed that there are eight scrambling codes per code group. The primary control unit 132 takes the first candidate 123*a*, and selects a frame extents value x 132*x* for the candidate 123*a* as, for example, trunc(f/m)=trunc(15/2)=7. Candidate 123a is thus passed to the primary correlation unit 131 with x 132x as seven. The primary correlation unit 131 performs a primary scrambling code correlation procedure across seven slots 14 for the eight scrambling codes within code group "3". The highest correlation result $S_1$ from the code group 124a is selected, and assume that this comes from scrambling code number six. Result a 133a would thus hold the value $S_1$, and the corresponding scrambling code number "6". The control unit 132f then determines a new value of x 132x for the next candidate 123m, again calculating x 132x as, for example, trunc(f/m)=trunc(15/2)=7. Candidate 123m is passed to the primary correlation unit 131 with x 132x as seven. It is generally preferable for all candidates to have the same correlation length, as this yields correlation results that are more "fair". The primary correlation unit 131 performs a primary scrambling code correlation procedure across seven slots 14 for the eight scrambling codes within code group "2". The highest correlation result $S_2$ from the code group 124m is selected, and assume that this comes from scrambling code number three. Result m 133m would thus hold the value $S_2$, and the corresponding scrambling code number "3". If it is assumed that $S_2$ exceeds $S_1$, the selection unit 134 then selects result m 133m as the synchronization result 135. The code group 135g is thus filled in as "2", the slot number 135s as "1", and the scrambling code 135c as "3". If the primary correlation result $S_2$ exceeds a threshold 132t, synchronization success is indicated to an upper layer (not shown). Otherwise, synchronization failure is indicated to the upper layer.

In contrast to the prior art, the present invention tests multiple candidates 123 by the stage 3 in a single frame 12 of slots 14, and so overall synchronization times are potentially decreased. Within a single frame 12, synchronization success or failure is determined for all potential candidates 123. It should be clear to one skilled in the art that, as the primary correlation unit 131 performs the primary correlation procedure, the primary correlation unit 131 may keep track of the hypothetical slot number 14 based upon the candidate 123a-123m information. Hence, the hypothetical slot number will change discontinuously when a new candidate 123a-123m is processed by the primary correlation unit 131. The present invention provides a secondary selection unit 122 for selecting m candidates 123, and a primary control unit 132 for dividing a frame 12 into m regions that are respectively allocated to the primary-correlation unit 131 to perform m primary correlation procedures respectively on the m candidates 123. The primary correlation procedure results in m intermediate results 133, the greatest valued of which is selected by a primary selection unit 134 to generate the synchronization result 135.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An improved method for performing cell searching in a wireless device, the method comprising:
    selecting m candidates according to secondary correlation results generated in a code group and slot number identification process, each candidate comprising a respective code group number and slot number, m being greater than 1;
    performing a primary scrambling code correlation process with each candidate to obtain a corresponding primary correlation result and associated primary scrambling code number, the primary scrambling code correlation process for each candidate performed over x slots, x is determined by the ratio f/m, where f is the number of slots per frame, x is greater than 1, and x is less than f; and
    selecting as a synchronization result the respective code group number, slot number and primary scrambling code number of the candidate having the greatest primary correlation result.

2. The method of claim 1 wherein selecting the m candidates comprises:
    selecting n greatest values from the secondary correlation results;
    normalizing the n greatest values with respect to a greatest secondary correlation result; and
    selecting as the m candidates the code group numbers and slot numbers corresponding to the normalized n greatest values that exceed a secondary threshold value.

3. The method of claim 1 wherein m is three.

4. The method of claim 1 wherein x is approximately f/m.

5. A wireless device for performing the method of claim 1.

6. A wireless device comprising:
    a first stage for providing slot synchronization information;
    a secondary correlation unit for generating secondary correlation results respectively corresponding to a code group number and a slot number according to the slot synchronization information;
    a secondary selection unit for selecting m candidates according to the secondary correlation results, each candidate comprising a respective associated code group number and slot number, m being greater than 1;
    a primary correlation unit for generating a primary correlation result and associated primary scrambling code number according to a supplied code group number, the primary correlation unit correlating over a timing value x of frames;
    a primary control unit for providing the timing value x to the primary correlation unit, the primary control unit determining the timing value x according to a ratio f/m, where f is the number of slots per frame, and providing the supplied code group number to the primary correlation unit from the m candidates, wherein x is greater than 1 and x is less than f; and
    a primary selection unit for selecting as a synchronization result the respective code group number, slot number and primary scrambling code number of the candidate having the greatest primary correlation result.

7. The wireless device of claim 6 wherein the secondary selection unit performs the following steps:
    selecting n greatest values from the secondary correlation results;
    normalizing the n greatest values with respect to a greatest secondary correlation result; and
    selecting as the m candidates the code group numbers and slot numbers respectively corresponding to the normalized n greatest values that exceed a secondary threshold value.

8. The wireless device of claim 7 wherein m is three.

9. The wireless device of claim 6 wherein x is approximately f/m.

* * * * *